Nov. 5, 1968     K. BERG ET AL     3,409,253

RETRACTABLE FUEL TANK FOR AIRCRAFT

Filed Dec. 2, 1966

INVENTORS.
KENNETH BERG
NORMAN O. BRINK
BUDDY L. DUFT
JERE L. ROBINSON
EDWARD C. SKEI
BY CURTIS E. THOMPSON

Lyon + Lyon
ATTORNEYS

INVENTORS.
KENNETH BERG
NORMAN O. BRINK
BUDDY L. DUFT
JERE L. ROBINSON
EDWARD C. SKEI
BY CURTIS E. THOMPSON

Lyon & Lyon
ATTORNEYS

United States Patent Office 3,409,253
Patented Nov. 5, 1968

3,409,253
RETRACTABLE FUEL TANK FOR AIRCRAFT
Kenneth Berg, El Cajon, Norman O. Brink, Buddy L. Duft, and Jere L. Robinson, San Diego, Edward C. Skei, Thousand Oaks, and Curtis E. Thompson, San Diego, Calif., assignors to Whittaker Corporation, Los Angeles, Calif., a corporation of California
Filed Dec. 2, 1966, Ser. No. 598,874
14 Claims. (Cl. 244—135)

ABSTRACT OF THE DISCLOSURE

A retractable or collapsible fuel tank for aircraft or the like wherein the volume of the tank may be varied. The tank is formed of a plurality of rigid segments, including intermediate segments hinged to end segments, and the rigid segments are coupled with sections of flexible material. When the tank is in a retracted position, the rigid segments enclose the flexible material and an internal retraction mechanism. The retraction mechanism includes truss members for moving the rigid segments, and a cable system for causing proper folding of the flexible sections.

---

This invention relates to fuel tanks, and more particularly to a retractable or collapsible fuel tank for aircraft wherein the volume of the tank may be varied.

Typical tactical aircraft currently in use have racks, or the like, under the fuselage or wing and on which many combinations of rockets, bombs, guns and fuel tanks are mounted to enable the aircraft to perform a variety of missions. Among the different types of missions assigned to tactical aircraft are those which require the use of external fuel tanks carrying additional quantities of fuel to enable long-range missions or to allow the aircraft to remain in an area, such as a target area, for a desired period of time.

The rigid fuel tanks now in use are designed to provide a minimum drag at the cruise speed of the aircraft. They may be designed either for subsonic or low supersonic flight. However, if a supersonic dash or maneuver is required the external tanks must be dropped. In other instances, the tanks are dropped to eliminate the possibility of ground fire penetrating and igniting the remaining fuel. It will be appreciated that inasmuch as these tanks are expended on typical missions, a substantial problem of supply thereof to a theatre of operations is presented. Not only are the tanks themselves and handling thereof costly, but also procuring, packing, shipping, uncrating, etc., of the tanks is expensive.

Accordingly, it is a principal object of this invention to provide an improved fuel tank for aircraft.

Another object of this invention is to provide an improved tank capable of reducing in size as fuel is used.

It is an additional object of the present invention to provide a retractable fuel tank for aircraft for reducing the logistic requirements of conventional external fuel tanks, and which does not impair the high speed maneuverability of the aircraft.

Another object of this invention is to provide an improved fuel tank for aircraft, wherein the tank has a maximum fuel capacity when required and presents a minimum performance penalty when the fuel therein is depleted.

A further object of this invention is to provide an improved fuel tank for aircraft wherein the cross-sectional area of the tank may be changed in flight as fuel is used by the aircraft.

An additional object of this invention is to provide an improved tank for aircraft which acts as a pump to expel fuel into the main fuel system of the aircraft.

Another object of this invention is to provide an improved fuel tank for aircraft which is capable of rapidly dumping the fuel therein upon command without the requirement of jettisoning the tank.

A still further object of this invention is to provide an improved fuel tank which may be attached permanently or semipermanently to an aircraft.

These and other objects and advantages of the present invention will become apparent upon consideration of the specification and drawings in which:

Briefly, in accordance with an exemplary embodiment of the teachings of the present invention, a retractable external fuel tank for aircraft is provided. Examples of aircraft with which the invention may be used include the F-100, F-105, F-111, etc. The tank may be permanently or semipermanently mounted on the aircraft, and the cross-sectional area thereof may be changed while the aircraft is in flight and fuel is being used by the aircraft. The tank is formed of a plurality of rigid segments, including intermediate segments hinged to end segments, and the rigid segments are coupled with sections of flexible material. The intermediate and end segments may be respectively cylindrical and conical in shape. The rigid segments provide the structural shell portions of the tank, and the flexible sections are coupled with the rigid segments to enclose the desired volume. The flexible sections fold inwardly upon retraction. When the tank is in a retracted position the rigid segments completely enclose the flexible material and the internal retracting mechanism of the tank.

A retraction mechanism is included within the tank and operates through truss members connected to the intermediate rigid segments to move the segments. The truss members transfer aerodynamic and inertia loads to the mount for the tank. A fuel pressure sensing system may be provided to monitor the fuel pressure and flow for operating the retraction mechanism to cause the shape of the tank to change as the fuel therein is depleted. In this manner, the fuel tank provides a constant pressure and variable volume system, but, if desired a variable pressure and variable volume system may be provided. A cable system or mechanism also may be provided for causing the proper folding of the flexible sections and for aiding in retracting the rigid segments.

The concepts of the present invention are diagrammatically illustrated in FIGURES 1 through 4. FIGURES 1A and 1B are perspective views of a typical aircraft 10 having a tank 11 according to the present invention mounted thereon. A tank 11 may be mounted on each wing. The tank 11 is shown fully expanded in FIGURE 1A, and fully retracted in FIGURE 1B. The tank includes a plurality of rigid segments 12 and 13, and flexible material 14 between the segments as best seen in FIGURE 1A. The segments 12 and 13 respectively are essentially circular and conical in shape. The segments 13 are hinged to the ends of the segments 12, and the segments 13 define tapered nose and tail ends for the tank. A fuel tank of this nature may have, for example, a 450 gallon capacity when fully expanded and a cross-sectional expanded-to-retracted area ratio of approximately 6.7 to 1 or greater. Typically, the fully expanded tank may have a cross-sectional area approximately 30 percent greater than a conventional tank, and about 80 percent less than the conventional tank when retracted. Inasmuch as the profile of the tank can be changed, the loads thereon can be reduced. The retracted tank will allow the aircraft to maneuver at maximum capability.

Figure 2A:
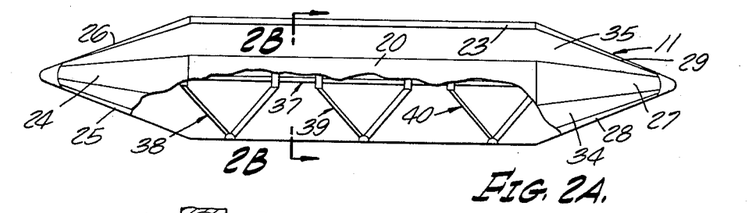
FIGURE 2A is a schematic elevational view of a retractable fuel tank according to the present invention.
Figure 2B:
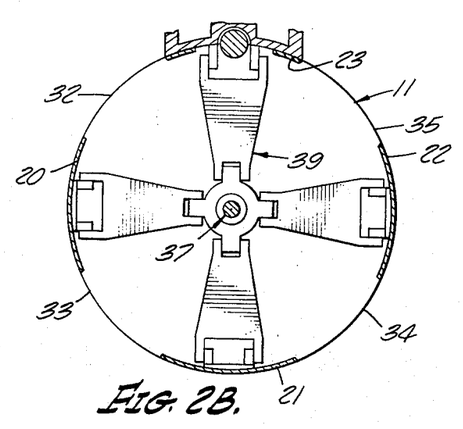
FIGURE 2B is a schematic cross-sectional view taken along a line 2B—2B of FIGURE 2A.
Figure 3A:
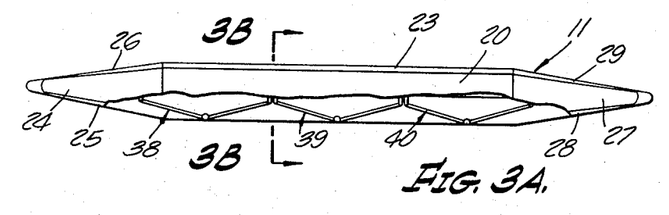
FIGURE 3A is a schematic view of the tank in FIGURE 2A in a retracted or collapsed configuration.
Figure 3B:
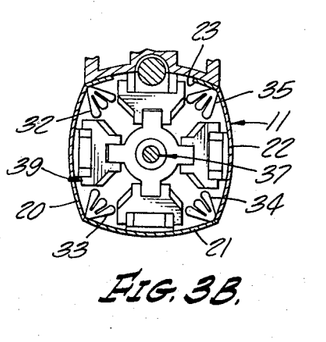
FIGURE 3B is a schematic cross-sectional view taken along a line 3B—3B of FIGURE 3A.

FIGURES 2 and 3 are schematic or diagrammatic views of a tank 11 respectively extended and retracted. As will appear subsequently, the tank itself includes several principle units; rigid segments, sections of flexible material and retraction mechanisms, and gauge and valve components may be provided as will appear subsequently. The rigid segments form the basic structural shell, and in the retracted position these segments totally enclose the tank mechanism. As shown in FIGURES 2 and 3, the tank 11 includes three cylindrical segments 20 through 22, a rigid top section 23 which is attached to the aircraft, and eight conical end segments, only end segments 24 through 29 being seen in FIGURES 2 and 3. These components are formed of lightweight rigid metal, such as an aluminum alloy. The ends of the cylindrical segments are hinged to the conical segments. Flexible material sections 32 through 35 are shown diagrammatically, and they are coupled between the rigid segments to enclose the volume and to allow the volume to be decreased. A secondary, or cable, mechanism may be provided for causing the flexible material sections to fold, and suitable stiffeners can be used to aid in the proper folding of these sections.

Figure 4:
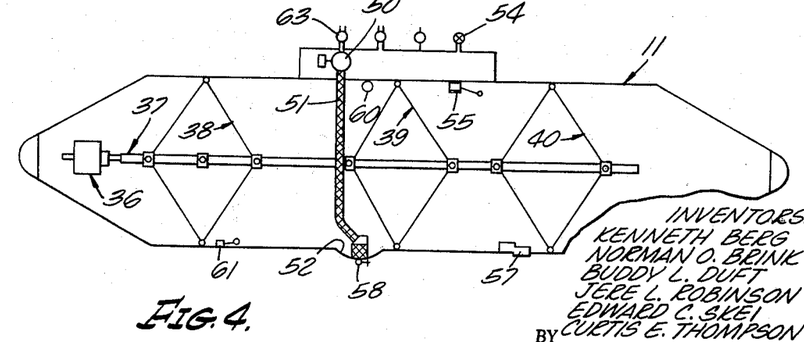
FIGURE 4 is a schematic cross-sectional illustration of a tank according to the invention.

The main retraction mechanism moves the rigid segments together, and also transmits loads to the tank mounting point or points. This retraction mechanism includes a motor 36 as seen in FIGURE 4, a jackscrew assembly 37 including a jackscrew having right and left hand threads, and a plurality of actuator truss assemblies 38 through 40. The jackscrew assembly opens and closes the truss assemblies in a scissors fashion. Gauge and valve components which may be used to control the flow and retraction rate are shown schematically in FIGURE 4 and will be discussed subsequently.

The number of rigid segments, and the flexible sections therebetween used to form a tank may vary from two to any reasonable larger number desired. It is considered that an ideal rertaction transition occurs from full circular cross section, and diminishes in a circular geometry to a circular retracted cross section. This arrangement requires a large number of rigid segments. On the other hand, a small number of segments provides a relatively simple arrangement, but the symmetry in retraction and in profile is reduced. A suitable tank has three or four of each of the rigid segments and flexible sections. It will be appreciated that a three segment arrangement does not provide as uniform a section change as a four segment tank. However, a tank having four rigid segments and four flexible sections coupled between the segments appears to offer the most suitable combination of load reaction, smoothest aerodynamic transition, and retraction mechanism simplicity. This arrangement also presents a favorable area ratio along with symmetrical folding and symmetrical profile.

FIGURE 4 is a schematic cross-sectional illustration of a tank along with various gauging and control components. This figure and the following discussion thereof illustrate the manner in which a retractable tank is coupled and used with the fuel system of an aircraft. Variations will be apparent, particularly after review of a detail embodiment of an exemplary tank according to the invention. A pressure actuated shutoff and check valve 50 is coupled through a flexible line 51 and extends to a sump 52. The valve 50 replaces the level control float valve usually used with in-flight refuelable tanks. The primary function of this valve is to prevent over pressurization of the tank during refueling. This condition will occur if refueling is faster than tank expansion. If tank pressure exceeds a given value, this valve closes thereby stopping refueling until tank expansion catches up. This valve may be a variable pressure regulator valve to provide pressure regulation for the fuel system.

An ullage control valve 54 is provided to vent the ullage of the retracted tank overboard during refueling of the tank. A level switch 55 may be coupled with the valve 54, and actuation of the level switch causes the valve 54 to stop venting when the retracted tank is full of fuel, and this switch also causes expansion of the tank to start. In this manner, expansion of the tank thus does not start until the retracted tank is full of fuel. A suction relief valve (not shown) may be included with the valve 54 to prevent a vacuum in the tank if the expansion speed becomes too fast during refueling.

The volume of fuel in the tank can be gauged through the use of a multiturn potentiometer coupled with the tank retraction mechanism, e.g. coupled to the jackscrew. Adjustable limit switches also may be coupled with the potentiometer or retraction mechanism to control the limits of tank expansion and retraction. A dump valve 57, such as a two inch submersible motor operated gate valve, may be suitably mounted in the tank to enable the contents of the tank to be rapidly dumped. Flexible fuel drain lines may be connected to the valve 57 to ensure that fuel trapped by the internal folds of the flexible material is dumped. A small manually operated drain valve 58 may be mounted in the sump 52 to provide a means for draining water condensation from the tank. A pressure switch 60 may be provided as a fail-safe feature to shut off the retraction mechanism in the event the main fuel system is shut off and the tank pressure exeeds a safe limit. Level control switches, such as the switch 55 and a switch 61, may be provided to detect the high and low fuel levels in the tank.

Fuel may be applied to the tank through a disconnect 63 and the valve 50 which is normally open, exiting into the tank at the sump 52. Venting of the tank occurs through the control valve 54 until the high level float switch 55 closes which thereby closes the control valve 54 and starts the retraction mechanism. If extension of the tank lags, fueling pressure in the tank builds up thereby closing the pressure actuated valve 50. This valve reopens when the pressure drops, allowing refueling to continue. When the tank is fully expanded, a limit switch turns off the motor 36. Fuel pressure buildup assures shutoff of the fuel to the tank, and if there is a malfunction of the shutoff valve 50, the ullage control valve 54 can act as a pressure relief valve to vent fuel overboard.

An internal tank pressure, such as four to six p.s.i., is necessary for stable expansion of the tank, particularly during in-flight refueling of the aircraft. Bleed air from the aircraft engines may be valved into the tank to stabilize and aid in retraction mechanisms during expansion. Control of the bleed air valve can be performed from the electrical system which initiates and controls power to the mechanism during expansion.

Transfer of fuel to the aircraft's main fuel tank is obtained by starting the retraction mechanism and expelling the fuel through the sump and out through the line 51, valve 50 and disconnect 63. If the main fuel system is full and cannot accept fuel, pressure builds up in the tank thereby causing the pressure switch 60 to stop the retracting operation until this pressure is lowered. The shutoff valve 50 may have a check feature which prevents it from blocking flow under these conditions. In case of retraction mechanism failure, the tank may be pressurized by the conventional pressurization valve of the aircraft, and the consequent pressure in the tank forces the fuel out through the disconnect 63. A scavenge pump system may be provided for reducing remaining fuel when the tank is retracted, and for high pressure fuel delivery. This system may use tank pressurization or a motor driven pump for removing the majority of the remaining fuel. Addtionally the tank may be purged of fuel fumes through the use of bleed air from the aircraft engines in a conventional manner or by incorporating an air valve in the forward portion of the tank.

Figure 5:
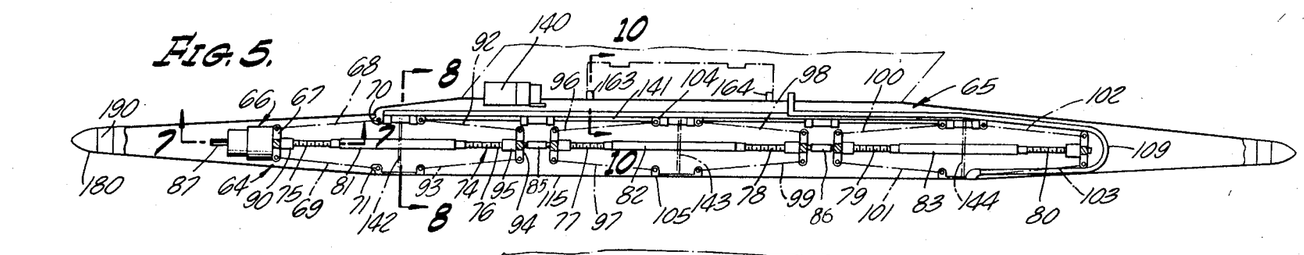
FIGURES 5 and 6 are elevational views which illustrate in more detail a fuel tank according to the invention and show a retracting mechanism thereof.
Figures 6, 14, 15:
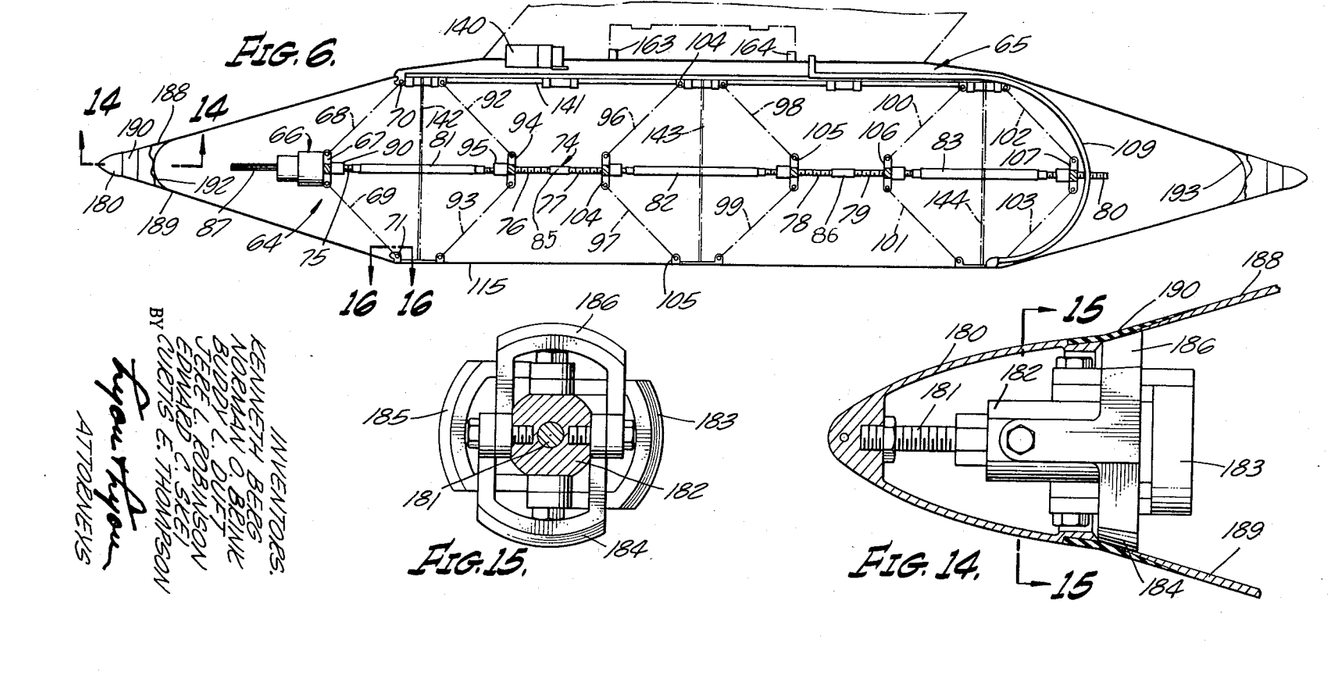
FIGURE 14 illustrates a cross-sectional view of an end of the tank taken along a line 14—14 of FIGURE 6.
FIGURE 15 is a cross-sectional view taken along a line 15—15 of FIGURE 14.

FIGURES 5 and 6 principally illustrate the retraction mechanism 64, and the top section 65, or strongback, of the tank by which the tank is secured to the aircraft. Although the rigid segments and flexible sections are not shown in detail in FIGURES 5 and 6, these segments and sections are included and are shown in greater detail in FIGURE 8. The retraction mechanism includes an integral motor-reducer unit 66 (note FIGURES 5, 6 and 7) bolted to a forward central actuator fitting 67. Actuator trusses, illustrated diagrammatically by lines 68 and 69, are coupled with the fitting 67 and to upper and lower truss hinge fittings 70 and 71. These fittings will be discussed in greater detail subsequently.

A jackscrew assembly 74 extends centrally through the fuel tank. This assembly includes jackscrews 75 through 80 coupled with torque shafts 81 through 83. The torque shafts 81 through 83 are connected between respective jackscrews 75 and 77, 77 and 78, and 79 and 80. Connectors 85 and 86 are coupled between respective jackscrews 76 and 77, and 78 and 79. The forward end of the jackscrew 75 is splined at 87 (note FIGURE 7), and a ball spline nut 88 affixed to the motor-reducing unit 66 is mounted on the spline 87 thereby allowing the motor-reducing unit 66 to move longitudinally with respect to the jackscrew assembly while this unit is rotating the assembly. The unit 66 may include a fractional horsepower motor operating through a gear reduction, such as a reduction of four hundred to one, to provide suitable torque. A high gear reduction is desired to prevent pressure or inertia loads from back driving the retraction mechanism.

A ball-screw nut 90 is affixed to the central actuator fitting 67. As the motor-reducer unit 66 rotates the jackscrew 75, this unit moves either to the right or to the left as shown in FIGURES 5 and 6 to cause the actuator trusses 68 and 69 to expand or contract. Similar trusses 92 and 93 are coupled with a central actuator fitting 94 which has a ball-screw nut 95 affixed thereto. In a similar manner, actuator trusses 96 through 103 are coupled with actuator fittings and nuts. These trusses are coupled with truss fittings 104 through 107. Similar trusses and truss fittings are provided in a horizontal plane for side rigid segments as will be apparent from a study of FIGURE 8. A flexible fuel line 109, like the line 51 in FIGURE 4, is shown within the fuel tank and extends up through the strongback 65 for supplying fuel to the aircraft.

Figure 8:
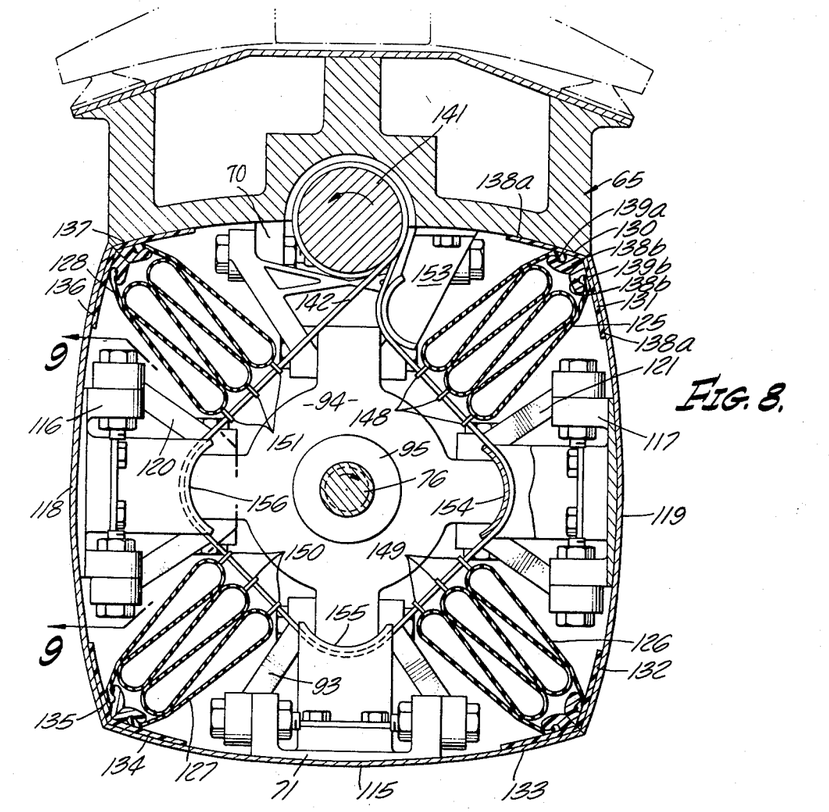
FIGURE 8 is a cross-sectional view taken along a line 8—8 in FIGURE 5 and illustrates the rigid segments and flexible sections of the tank in a retracted position.
Figure 9:
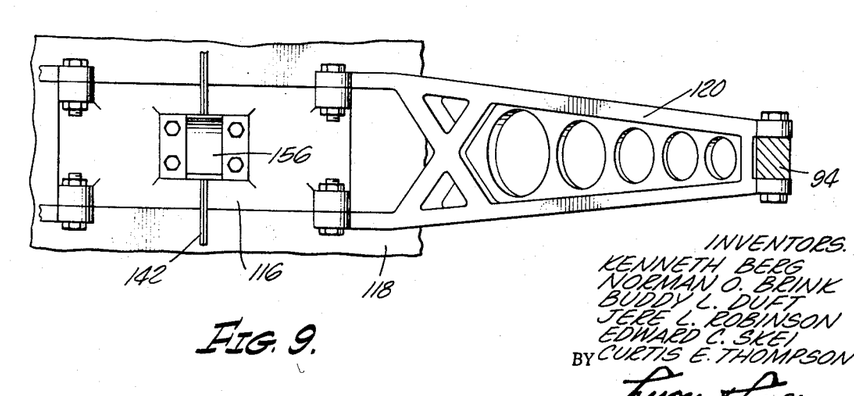
FIGURE 9 is a cross-sectional view taken along a line 9—9 in FIGURE 8.

Referring now to FIGURES 8 and 9, the upper truss hinge fitting 70 may be formed as a part of, or secured to, the strongback 65, and is shown with the actuator truss 92 coupled from this hinge to the actuator fitting 94. Similarly, the truss 93 is connected between the actuator fitting 94 and the lower truss hinge fitting 71. The fitting 71 is affixed to a lower rigid segment 115 which forms the bottom of the tank. In a similar manner, side truss hinge fittings 116 and 117 are affixed to respective side rigid segments 118 and 119, and are coupled through respective trusses 120 and 121 to the actuator fitting 94. It will be apparent that as the actuator fitting 94 moves to the left as shown in FIGURES 5 and 6 (toward the plane of the drawing in FIGURE 8) the segments 115, 118 and 119 will be caused to move outwardly thereby expanding the tank to the position shown in FIGURE 6.

Flexible sections 125 through 128 are coupled between the rigid segments and the strongback, and these sections are shown in a fully folded configuration in FIGURE 8. Seal members or moldings 130 through 137 are affixed to and run along the entire length of each of the rigid segments, and provide a means for attaching and sealing the edges of the flexible sections. Each of the seal members 130 through 137 are alike and may be formed of flat and curved metal sections. For example, the members 130 and 131 include flat sections 138A and curved sections 138B to securely hold beads 139A and 139B along the edges of the flexible sections 125. The beads are provided by imbedding wires in the edges or by a suitable buildup of material at the edges of the flexible sections.

Figure 1A:
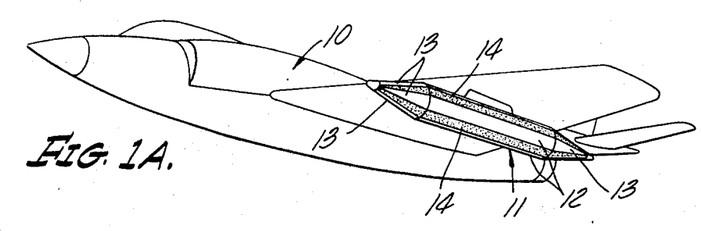
FIGURES 1A and 1B are perspective views of typical aircraft having tanks according to the present invention mounted thereon.
Figures 1B, 7, 10, 11, 17:
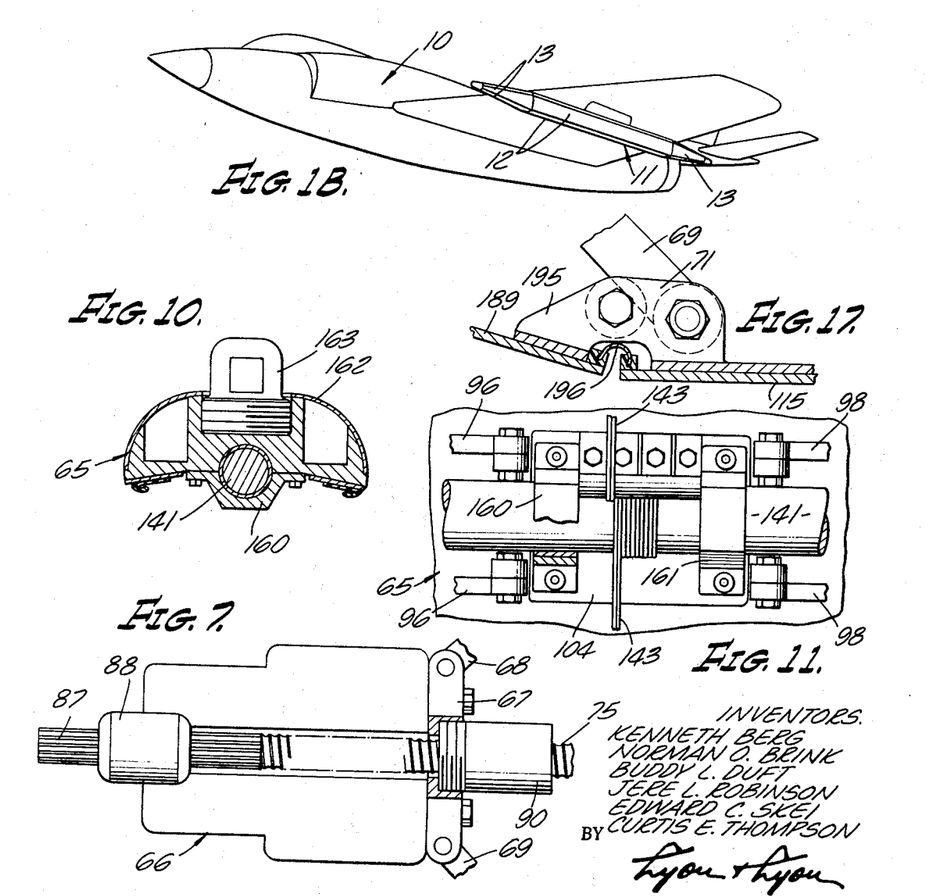
FIGURE 7 illustrates a motor and reducer for retracting rigid segments of the tank.
FIGURES 10 and 11 illustrate details of a cable retraction mechanism of the tank, FIGURE 10 being taken along a line 10—10 of FIGURE 5.
FIGURES 16 and 17 are detailed views of the manner in which cylindrical and conical segments are hinged together, FIGURE 17 being taken along a line 17—17 of FIGURE 16.

A flexible section retracting mechanism, or cable system, also is provided. This system includes a motor 140 (FIGURES 5 and 6) which drives a shaft 141. The shaft is journalled at the upper truss fittings as indicated in FIGURES 10 and 11. The motor may be outside the track as shown or in the strongback and sealed with respect to the interior of the tank, or the motor may be within the tank. Cables 142 through 144 are driven by the shaft 141 and are attached to the flexible section and to the rigid segments. Preferably double cables are used for each of the cables 142 through 144 as a fail-safe feature. The cable 142 is shown in FIGURE 8 and this cable is wound the shaft 141 and extends through cable guides attached to the flexible sections and to the rigid segments. A plurality of cable guides 148 through 151 are shown affixed to the flexible sections 125 through 128 in FIGURE 8. A cable idler pedestal 153 is affixed to the upper truss fittings 70 to guide the cable 142, and cable guides 154 through 156 are affixed to the respective truss fittings 117, 71 and 116. The cables 143 through 144 are attached to the flexible sections and rigid segments in a similar manner. FIGURES 10 and 11 illustrate the manner in which the shaft 141 is supported by bearing caps 160 and 161 attached to the upper truss hinge fitting 104. The shaft is supported at the other upper truss hinge fitting and between the hinge fittings in a similar manner as shown in FIGURES 5 and 6. A cover fairing 162 may be provided over the strongback. Mounting lugs 163 and 164 are attached to the strongback 65 for mounting the tank to the aircraft.

Figures 12A, 12B, 12C, 13, 16:
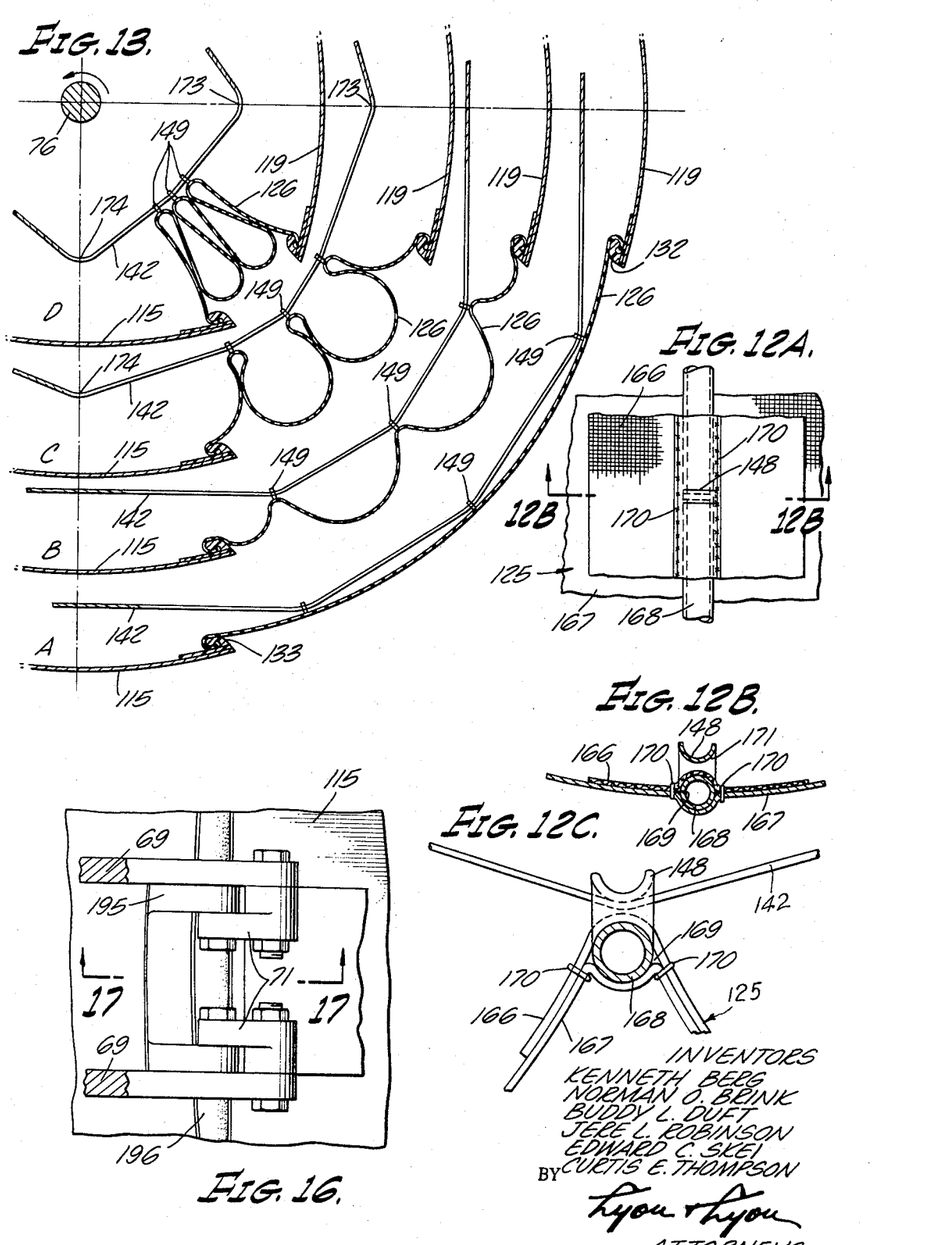
FIGURES 12A through 12C illustrate a section of a flexible section and a stiffener therein, FIGURE 12B being taken along a line 12B—12B of FIGURE 12A.
FIGURE 13 illustrates a typical folding sequence of flexible sections of the tank during retraction thereof.

FIGURES 12A through 12C illustrate a portion of a flexible section 125, and the manner in which stiffeners may be provided therefor. The stiffeners are not shown in FIGURE 8 for simplicity of illustration. The material should, of course, be relatively strong, be fuel resistant, have low temperature flexibility, and it is necessary that stiffening at low temperatures be low because otherwise the power requirements imposed on the retracting mechanism may become excessive under low temperature conditions. It is preferable that the material be constructed of one or more plies of coated fabric. Nylon fabric may be used, and the coating may be polyester-based polyurethane. The required thickness of the material is a function of the linear loading that may be encountered. From a power requirement standpoint, it is preferable to construct the flexible sections from unbonded layers with each layer having a number of plies bonded together. For example, the sections may be formed from two thin layers 166 and 167 which are not bonded together other the beaded edges of the flexible sections can be formed from two plies of coated fabric. It will be apparent that the beaded edges of the flexible sections can be formed much in the same manner as a tire through the use of an inserted wire or wires, or by a buildup of material at the edges. Molded inserts also may be used to supplement the stiffeners and facilitate the folding action.

A plurality of longitudinal stiffeners preferably are provided in each section of flexible material. The length of the stiffeners is substantially coextensive with the length of the rigid cylindrical segments. A stiffener 168 which, for example may be a titanium tube, is inserted between the layers 166 and 167 and sealed with a sealant 169. Stitching 170 may be provided on each side of the stiffener. A plurality of cable guides 148 as shown in FIGURES 8 and 12 are provided, and these cable guides may be made of titanium and welded to the tube stiffeners. The surface 171 of the cable guide 148 shown in FIGURE 12B which is engaged by the retracting cable preferably is coated with fluorocarbon resin, such as that sold under the tradename Teflon, to reduce friction. The corresponding surfaces of the cable guides for the rigid segments and the idler pedestals are similarly coated.

In the embodiment of flexible sections illustrated in cross-section in FIGURE 8, three tube stiffeners (not shown) are provided in each of the flexible sections 125 through 128 and run substantially the length of the rigid cylindrical segments. Also, cable guides are attached to each stiffener and are engaged by the respective cables 142 through 144 (note FIGURES 6 and 8). It will be apparent that this arrangement along with the cable system causes the flexible sections to fold properly as shown in FIGURE 8 when the tank is retracted. A different number of stiffeners may be used if desired, and four for each flexible section is also particularly desirable. The ends of the flexible sections which extend past the ends of the rigid cylindrical segments and are attached to the conical rigid segments may have separate but similar tube stiffeners therein, if desired, to ensure that continuous and even folds in the flexible sections occur at the tapered ends of the tank. In this case, the end stiffeners may be hinged to the ends of respective central stiffeners.

It will be apparent from FIGURE 8 that fuel may become trapped between the lower flexible sections 126 and 127 and the side rigid segments, and between the lower folds of these flexible sections, when the tank is in the fully retracted position. Hence, in order to ensure that all fuel can be drained from the tank by the pump valve 57 (FIGURE 4), it is desirable that flexible fuel lines extend into these areas.

FIGURE 13 illustrates a sequence of cross-sectional configurations of the flexible sections and rigid segments through steps A, B, C and D respectively showing the tank full open, three-quarters open, half open, and one-quarter open. As noted previously, FIGURE 8 shows the configuration when the tank is fully retracted. Bends 173 and 174 in the cable 142 represent the cable engaging the cable guides 154 and 155 shown in FIGURE 8. The stiffeners are not shown in this figure for simplicity of illustration.

The cables initially only retract the flexible sections and thus they control the retracting positions of the flexible sections. At a subsequent retracted position, the flexible sections exert a pull that counteracts the pressure loading on the rigid segments. With the diminishing of the pressure loading on the rigid segments, truss mechanism can advance from a stalled drive position toward a retracted position. Further retraction of the cable system allows sufficient engagement of the cables into the cable guides of the rigid segments (note reference numerals 173 and 174 in FIGURE 13) to permit pressure loads of the rigid segments to be taken directly by the cables, and not by routing through the flexible sections. The cable loading becomes more pronounced at the rigid segments as the effective pressure area of the flexible sections diminishes. Approaching complete retraction, the cable system not only accommodates the rigid segment pressure loads but also aids the truss mechanism in overcoming its reduced mechanical efficiency which occurs when the trusses approach their fully open position (note FIGURE 5) which occurs when the tank is near its fully closed or fully retracted position.

The truss retraction mechanism and the cable mechanism for the flexible sections are complementary systems. They are powered to work against a predetermined pressure and inertia loads in the three axes of the tank. The two systems may be coordinated by slaving the truss retraction mechanism to the cable mechanism by limiting the truss mechanism drive capability and forcing it to follow the cable mechanism. The flexible section cable mechanism reacts the internal pressure loads during retraction and pull in of the flexible sections, and helps to pull in the rigid segments. The truss retracting mechanism need only have a drive capability necessary to react the moderate inertia loadings on the rigid segments. As long as the flexible section cable mechanism relieves the pressure load from the rigid segments, the truss mechanism will function and subsequently follow. The retraction mechanism can be governed with a pressure/volume sensing control circuit. This will provide a simple governing system for directly relating the tank pressure and fuel volume to the speed of the tank closure.

The normal retraction time of the tank may be between 30 and 35 minutes which closely corresponds to the fuel consumption rate of typical aircraft. Variation in retraction speed during normal retraction may be provided by the drive motors, and this is readily accomplished if direct current motors are employed. Inasmuch as it is desirable to rapidly dump the fuel under certain circumstances, a low, or variable, speed may be used for normal retraction, while a high speed is used for rapid retraction to close the tank in a short period of time, such as two to four minutes, when it is necessary to dump fuel. The dump valve 57 should have a capability of dumping fuel within approximately thirty seconds.

FIGURES 14 and 15 illustrate an exemplary nose cone assembly which may be used for both the nose and tail ends of a tank. A nose cone 180 is coupled through a stud 181 to a boss 182. Four yokes 183 through 186 are pivotally coupled with the boss 182. These yokes are affixed to the ends of four conical rigid segments, only segments 188 and 189 being seen in FIGURE 14. A molded annular elastic boot 190 is provided at the interface of the nose cone 180 and the conical segments to provide a seal. If desired, additional seals of flexible material which are coupled to the rigid conical segments and to the flexible sections near the nose cone assembly as indicated at 192 and 193 in FIGURE 6 may be provided to seal the interior of the tank from the nose and tail cones.

FIGURES 16 and 17 illustrate the manner in which each of the conical rigid segments are hinged to respective cylindrical rigid segments, and to the top section 65. A hinge member 195 is affixed to the conical segment 189 and coupled with the truss hinge fitting 71. A flexible seal 196, which may be formed of the same material as the flexible sections, is secured in moldings between the ends of the rigid segments 115 and 189.

As a fail-safe feature, inoperativeness of either the jackscrew assembly or cable assembly driving motors, or failure of electrical power to reach these motors, may be sensed and used to activate a cutoff circuit for the remaining motor. This will provide a rigid truss and cable retraction structure. As an added safety feature, each drive motor may have an integral brake which becomes active upon loss of electrical power to the motor. In this event, bleed air may be automatically valved into the tank to expel remaining fluid and to pressurize the tank. Tank pressurization maintains a rigidizing load on the flexible sections of the tank when it is not closed.

It now will be apparent that tanks constructed in accordance with the concepts of the present invention provide improved means by which fuel can be carried by aircraft, and particularly carried externally on high performance aircraft. Upon depletion of the fuel, the tanks can be retracted and maximum maneuvering can be accomplished without the need for jettisoning the tanks. The tanks in the retracted configuration also will reduce the likelihood of a ground fire hit in the tank because of its relatively small area. The use of such restractable fuel tanks also will substantially reduce the need for large numbers of expendable tanks which must be shipped, stored, installed, etc.

The components of the tank should be lightweight but rigid. Except for the flexible material, aluminum alloy is used for most components. The drive shaft, jackscrew, ball-screw nuts, cables, and components of this nature may be made of steel to ensure reliability.

What is claimed is

1. A retractable tank for aircraft or the like comprising
a plurality of rigid means forming liquid contacting surfaces of said tank, said rigid means including intermediate members hinged to end members, said end members forming nose and tail ends,
flexible means coupled with said intermediate members and end members for enclosing a liquid volume within said tank, and
retraction means coupled wtih said rigid means, said retraction means including driving means and arm means, said arm means being coupled between said driving means and said intermediate members for causing said rigid means to expand or retract under control of said driving means.

2. A tank as in claim 1 wherein
said retraction means further includes retracting means coupled with said flexible means to cause retratcion of said flexible means.

3. A tank as in claim 2 wherein
said retracting means includes cable means coupled with said flexible means and said intermediate members to cause retraction of said flexible means and to aid retraction of said intermediate members.

4. A retractable tank for aircraft or the like comprising
a plurality of rigid means serving to define the peripheral configuration of said tank, said rigid means including intermediate members hinged to end members said intermediate members are substantially cylindrically shaped structural members, and said end members are substantially conically shaped structural members and define nose and tail ends each having an apex and a base, the base portion of said end structural members being hinged with ends of respective intermediate structural members,
flexible means coupled with said rigid means and enclosing a volume within said tank, and
retraction means coupled with said rigid means, said retraction means including driving means and arm means, said arm means being coupled between said driving means and said intermediate members for causing said rigid means to expand or retract under control of said driving means.

5. A tank as in claim 4 wherein
four of said intermediate structural members are provided, one of which provides means for attaching said tank to an aircraft.

6. A tank as in claim 4 wherein
each intermediate member with end members hinged to the respective ends thereof define a peripheral segment of said tank, and
said flexible means includes flexible sections secured between adjacent peripheral segments.

7. A tank as in claim 6 wherein
four of said peripheral segments are provided, one of which provides means for attaching said tank to an aircraft.

8. A tank as in claim 6 including
means coupled with said tank to control the retraction and expansion thereof as fuel exits or enters said tank.

9. A retractable tank for aircraft or the like comprising
a plurality of peripheral segments each having a rigid intermediate member and rigid end members hinged thereto,
a plurality of flexible sections coupled between adjacent peripheral segments, the combination of peripheral segments and flexible sections enclosing a volume within said tank,
a retraction mechanism mounted within said tank and including truss members hinged to said intermediate members, said retraction mechanism serving to expand or retract said intermediate members, and
a cable mechanism including cable means coupled to said flexible sections and to said intermediate members within said tank, said cable mechanism serving to retract said flexible sections and to aid retraction of said intermediate members.

10. A tank as in claim 9 wherein
one of said intermediate members serves as a mounting member for said tank, the remaining intermediate members being substantially cylindrically shaped and said end members being substantially conically shaped, and
nose and tail members coupled with said end members.

11. A tank as in claim 10 wherein
four of said intermediate members are provided with four end members respectively hinged to the ends thereof, said intermediate and end members, flexible sections and nose and tail members thereby forming a substantially cylindrical intermediate section and substantially conical nose and tail ends for said tank when in an expanded condition.

12. A tank as in claim 9 wherein
said flexible sections include longitudinal stiffener means and means coupled with said cable means for ensuring proper folding of said flexible sections as said tank is retracted.

13. A retractable tank for aircraft or the like comprising
a supporting member and a plurality of intermediate members,
a first and second plurality of end members, said first and second plurality of end members being respectively coupled with the ends of said supporting member and said intermediate members and hinged with respect thereto,
nose and tail members coupled to the ends of said first and second plurality of end members, respectively,
said supporting member and intermediate members and said first and second plurality of end members defining the peripheral configuration of said tank tapering at the ends of said nose and tail members, each intermediate member and end members hinged to the ends thereof defines a peripheral segment of said tank,
a plurality of flexible sections coupled between adjacent peripheral segments, the combination of peripheral segments and flexible sections enclosing a volume within said tank, a retraction mechanism within said tank and including means hinged to said supporting and intermediate members to expand or retract said tank, and cable means coupled to said flexible sections and to said intermediate members, said cable means serving to retract said flexible sections and to aid retraction of said intermediate members.

14. A tank as in claim 13 wherein three of said intermediate members and four of said flexible sections are provided, and each of said flexible sections includes longitudinal stiffener means substantially coextensive with the length of said intermediate members and includes means coupled with said cable means for ensuring proper folding of said flexible sections as said tank is retracted.

References Cited

UNITED STATES PATENTS

| 977,129 | 11/1910 | Reynolds | 4—177 |
| 3,101,921 | 8/1963 | Price | 244—135 |
| 3,167,103 | 1/1965 | Hawthorne et al. | 150—.5 |
| 3,289,721 | 12/1966 | Benson | 150—.5 |

MILTON BUCHLER, *Primary Examiner.*

J. PITTENGER, *Assistant Examiner.*